Patented Aug. 7, 1934

1,969,099

UNITED STATES PATENT OFFICE 1,969,099

MANUFACTURE OF HIGHLY REFRACTORY PRODUCTS

Eugen Ryschkewitsch, Frankfort-on-the-Main, Germany, assignor to Deutsche Gold & Silber Scheideanstalt vormals Roessler, Frankfort-on-the-Main, Germany, a corporation No Drawing. Application March 26, 1931, Serial No. 525,620. In Germany April 8, 1930

8 Claims. (Cl. 106—9)

My invention relates to an improvement in the manufacture of highly refractory masses and products such as bricks, crucibles, tubes and the like from zirconia and refers in particular to the addition of beryllium oxide to the mixture which consists of zirconium oxide as main constituent and magnesium oxide, which latter may be present in quantities up to 5 percent.

I have found that by admixing beryllium oxide I obtain a very great improvement in the highly refractory products. This improvement consists mainly in a much greater mechanical strength so that I can subject the articles made to strong changes in temperature without danger that cracks occur.

The amount of beryllium oxide which according to my invention I have found necessary to add to the mixture of zirconium oxide and magnesium oxide to obtain the results aimed at ranges from about 0.5 to about 1.5–2.0%. The addition of the beryllium oxide need not necessarily be in this form but may also take place in the form of compounds which in the course of manufacturing the articles and finally firing them may be converted into beryllium oxide. Such compounds of beryllium are, for instance, beryllium chloride which will furnish the beryllium oxide on treating the mixture of zirconia, magnesia and beryllium chloride with water in order to make the mixture plastic and subsequently firing the articles formed.

The zirconia taken for carrying out my process of manufacturing highly refractory articles may be in the form of freshly precipitated and newly produced zirconium oxide. It may also be partly replaced by zirconia which has been previously heated to high temperatures. The latter may be derived with advantage from previously manufactured articles which have already been fired or may be zirconia which has been heated specially for this purpose. When using zirconia from products which had already been heated to high temperatures the products are broken up and comminuted according to the size required and the fired zirconia which according to its origin may also contain some additional quantities of magnesia and beryllium oxide may be admixed to the mixture of fresh i. e. not previously heated zirconium oxide, megnesia and beryllium oxide in accordance to my invention. By adding these quantities of zirconia or zirconia mixture which has already been fired and used respectively has the result that the articles manufactured with its aid show a smaller shrinkage than articles prepared solely with fresh zirconia.

The amount of re-used, previously fired zirconia to be admixed may vary within wide limits. For articles of small size which shall be very dense a few percent of previously fired or highly heated zirconia or refractory material consisting mainly of zirconia may be added whilst I found it useful with large articles to use as much as one part and more of the previously highly heated material to each one part of the not heated mixture prepared in accordance with my invention.

In order to convert the masses into plastic form I add some hydrolysable compound to the dry pulverulent mixture and grind the mixture for some length of time before I add the water required for making the mass plastic. The hydrolysable compound may be zirconium chloride or any other zirconium compound which will yield zirconium oxide or zirconium hydroxide respectively when coming into contact with water or magnesium chloride. It may also be beryllium chloride in quantities which finally will yield partly or totally the amount of beryllium oxide necessary to carry out my invention into practice. Thus a part of the beryllium oxide may be added in the form of beryllium chloride and part of it in the form of beryllium oxide.

The firing of the articles produced from the plastic mass is carried out in the ordinary way. I found it advantageous to fire the articles, for instance, at 1400° centigrade and more.

Example 1

1000 parts by weight of zirconia, 20 parts of calcined magnesia and 10 parts of beryllium oxide are mixed and ground together. To the pulverulent mixture 30 parts of zirconium tetrachloride are added and the whole mixture mixed intimately for some hours. According to the manner of its use i. e. whether the articles to be manufactured shall be made by casting or shaping or stamping respectively, 1000 to 2000 parts of water for casting mixtures, 200 to 400 parts of water for shaping and 100 to 150 parts of water for stamping mixtures are added.

Example 2

1000 parts of zirconia, 30 parts of magnesia are mixed in a finely divided form and 20 parts of beryllium chloride are added, where upon the mixture is again thoroughly mixed and ground for several hours.

To this mixture 1000 parts of ground material derived from a batch previously manufactured and heated to a high temperature of say 1400° centigrade and more are added.

The mixture thus obtained is mixed with water in proportions given in Example 1.

From these mixtures articles are formed in the well known way and after being dried, heated to temperatures of about 1500° centigrade.

What I claim is:

1. Improvement in the manufacture of highly refractory products which consists in admixing beryllium oxide in amounts of from 0.5 to 2.0 percent to a mixture containing zirconia as main constituent and up to 5% magnesia.

2. Refractory material containing 100 parts of zirconia, one to five parts of magnesia and 0.5 to 2 parts of beryllium oxide.

3. Refractory material consisting of 100 parts of zirconia, two parts of magnesia and about one part beryllium oxide.

4. Process for the manufacture of highly refractory products which consists in mixing a dry mixture consisting of 100 parts of zirconia, one to five parts of magnesia, and 0.5 to 2 parts of beryllium oxide with a compound selected from the group consisting of hydrolyzable compounds of zirconium, magnesium, and beryllium, shaping said mixture after addition of water and firing the articles thus formed at temperatures of 1400 degrees C. and more.

5. Process for the manufacture of highly refractory products which consists in mixing a dry mixture consisting of 100 parts of zirconia, two parts of magnesia and one part of beryllium oxide with a compound selected from the group consisting of hydrolyzable compounds of zirconium, magnesium, and beryllium, shaping said mixture after addition of water and firing the articles thus formed at temperatures of 1400 degrees C. and more.

6. Process for the manufacture of highly refractory products which consists in mixing a dry mixture consisting of 100 parts of zirconia, one to five parts of magnesia and 0.5 to two parts of beryllium oxide with a small quantity of zirconium chloride, shaping said mixture after addition of water and firing the articles thus formed at temperatures of 1400° C. and more.

7. Process for the manufacture of highly refractory products which consists in mixing a dry mixture consisting of 100 parts of zirconia and one to five parts of magnesia with two parts of beryllium chloride shaping said mixture after addition of water and firing the articles thus formed at temperatures of about 1400° centigrade.

8. Process for the manufacture of highly refractory products which consists in adding comminuted highly heated material from a previous batch to a mixture consisting of 100 parts of zirconia, one to five parts of magnesia and 0.5 to two parts of beryllium oxide admixing some compound selected from the group consisting of hydrolyzable compounds of zirconium, magnesium, and beryllium, shaping said mixture after addition of water and firing the articles thus formed at temperatures of about 1400 degrees centigrade.

EUGEN RYSCHKEWITSCH.